No. 735,535. PATENTED AUG. 4, 1903.
R. C. LAYTON.
CAR FENDER.
APPLICATION FILED JAN. 5, 1903.
NO MODEL.
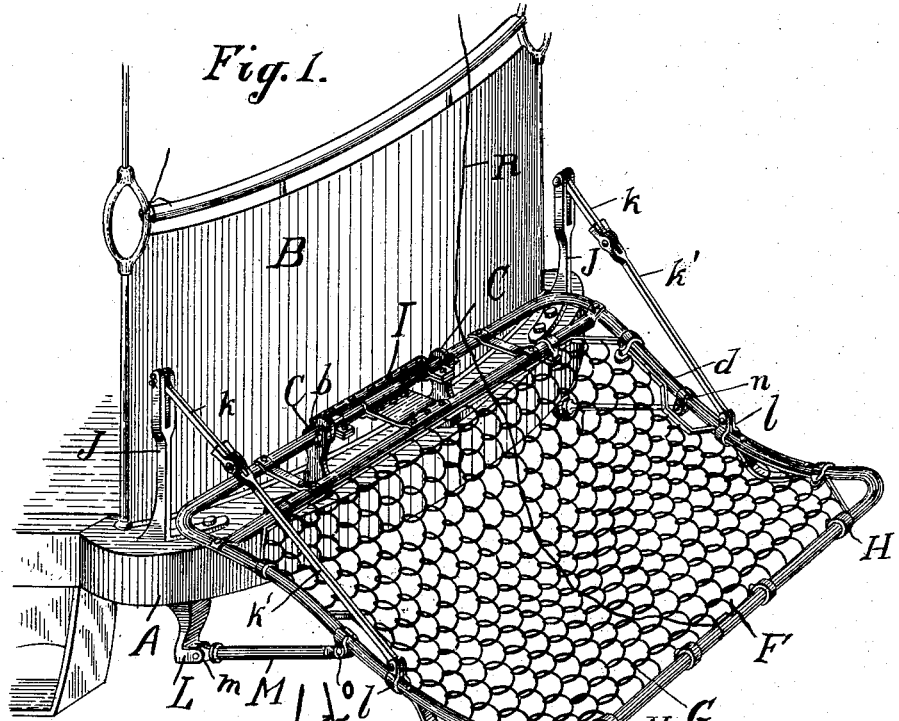
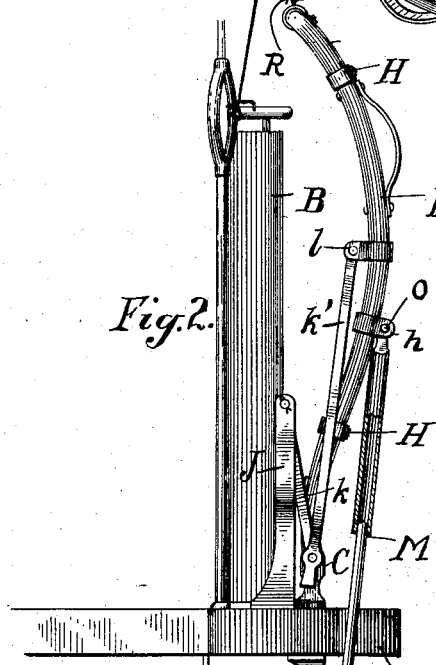
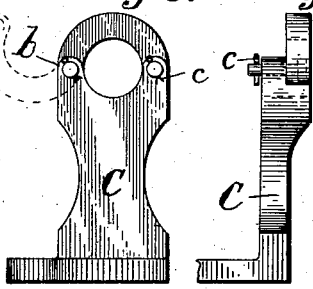
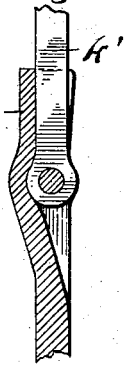
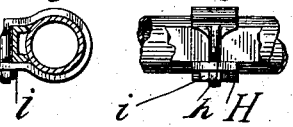
Witnesses
Richardson C. Layton, Inventor
By his Attorney No. 735,535.

Patented August 4, 1903.

UNITED STATES PATENT OFFICE.

RICHARDSON C. LAYTON, OF NEW YORK, N. Y., ASSIGNOR TO EMPIRE PIPE BENDING AND SUPPLY COMPANY, A CORPORATION OF NEW YORK.

CAR-FENDER.

SPECIFICATION forming part of Letters Patent No. 735,535, dated August 4, 1903.

Application filed January 5, 1903. Serial No. 137,929. (No model.)

*To all whom it may concern:*

Be it known that I, RICHARDSON C. LAYTON, a citizen of the United States, residing at the borough of Brooklyn, New York city, in the county of Kings and State of New York, have invented certain new and useful Improvements in Car-Fenders, of which the following is a specification.

My invention has reference to improvements in car-fenders, and has for its objects, first, simplicity in construction; secondly, adaptability to being raised and lowered and when raised to be within the line of the car-bumper; thirdly, the retention of the fender in a definite position by supports located above or below the platform or bumper, and, fourthly, to permit the fender to be readily transferred from one end of the car to the other.

The nature of my invention will best be understood when described in connection with the accompanying drawings, in which—

Figure 1 represents a perspective view of a fender embodying my invention, same being shown attached to the front of a car. Fig. 2 is a side elevation showing the fender lifted or folded. Fig. 3 is a side elevation of one of the standards to which the fender is connected. Fig. 4 is a front elevation of the same. Fig. 5 is a section showing the construction of one set of sustaining-links. Fig. 6 is a transverse section illustrating the construction of the clamps for holding the netting to the frame. Fig. 7 is a face view of the same, all said Figs. 3 to 7 being drawn on an enlarged scale.

Similar letters of reference designate corresponding parts throughout the several views of the drawings.

Referring now to the drawings, the letter A designates the platform or bumper of the car, curved in a usual manner and extending beyond the dashboard B. Upon the platform or bumper are mounted two standards C, provided with caps hinged to said standards at $b$ and adapted to be secured by split pins or cotters $c$ of a usual construction, so that said caps can be drawn upwardly when said pins or cotters are removed to permit the removal of the fender F from said standards, said fender having a portion of its frame $d$ journaled in said standard $b$.

For the frame $d$ of the fender I make of one piece of hollow tubing bent to the desired form, preferably using ordinary wrought-iron tubing upon which is stretched a netting G, which is secured to said frame by means of clamps H, encompassing said frame and through which are passed bolts $h$ and provided with nuts $i$, said nuts extending through the end links of the netting. The frame $d$, as before stated, is in the form of a continuous tubular member having its ends meeting at or near the center of the fender, so as to fall within the bearing I, attached to the platform or bumper of the car.

It will be readily understood that the fender F can turn freely within the standards C, and in order to hold it in its proper position relative to the rails of the track I provide the following means: Upon the platform A are mounted standards J, having attached thereto the ends of links $k$, connecting with links $k'$, hinged to the fender at $l$, the connection between the links being effected by a pivot-joint having a stop $n$ for arresting the motion of the link $k'$ when it is in line with the link $k$.

To insure stability of the fender, I support it from below by the following means: Pendent from the platform or bumper are two hangers L L, to which are hinged at $m$ telescopic rods M, having their ends hinged at $o$ to the frame of the fender. The two members of the telescopic rods M are preferably so arranged that they come to a stop when the fender is completely down—that is, when the links $k\ k'$ are in line with each other and held by their stops.

The fender F may be lifted by means of a chain R or any other suitable means in a usual manner and lowered without requiring the motorman or conductor to leave his post. To remove the fender, the cotter-pins $c$, securing the links $k$ and $k'$ to the standards J J, are withdrawn and the fender then carried to the other end of the car and placed in position for the return trip at the front of the car.

What I claim as new is—

1. A fender for cars comprising a continuous frame, a network extending across said frame, means for removably hinging said frame at its top, and means for removably attaching and holding said fender to the car located at the sides of the fender and supporting the same from above and below, substantially as described.

2. In combination with a fender hinged to the platform, of supporting members attached to the platform and permitting upward movement of the fender, and an upper set of supporting means permitting like movement of said fender, and both said supporting means being detachable, substantially as and for the purpose set forth.

3. In combination with a car, a fender hinged to said car and adapted to fall within the line of the bumper or platform when raised, and said fender being suspended from above and supported from below by detachable means, substantially as described.

4. A fender for cars comprising a continuous frame, a network extending across said frame, and clamps encompassing the frame and provided with means for engaging the network for holding the same to the frame, substantially as described.

In testimony whereof I have hereunto set my hand in the presence of two subscribing witnesses.

RICHARDSON C. LAYTON.

Witnesses:
A. FABER DU FAUR, Jr.,
JAMES W. MCELHINNEY.